United States Patent [19]
Hasegawa et al.

[11] 3,823,411
[45] July 9, 1974

[54] FLASH DISABLING INTERLOCK RESPONSIVE TO INTERCHANGEABLE LENS SELECTION

[75] Inventors: Goro Hasegawa, Tokyo; Masao Aoyagi, Yokohama; Yukio Mashimo, Tokyo, all of Japan

[73] Assignee: Canon Kabushiki Kaisha, Tokyo, Japan

[22] Filed: Feb. 1, 1973

[21] Appl. No.: 328,738

[30] Foreign Application Priority Data
Feb. 14, 1972  Japan................................ 47-15424
Feb. 14, 1972  Japan................................ 47-15425

[52] U.S. Cl.................. 354/33, 354/127, 354/149, 354/286
[51] Int. Cl. .................................. G03b 15/03
[58] Field of Search ....... 95/11 L, 11 R, 11.5, 44 R, 95/45

[56] References Cited
UNITED STATES PATENTS
3,007,381  11/1961  Melle............................. 95/44 R X
3,394,644  7/1968  Ettischer........................ 95/44 R X
3,439,600  4/1969  Minoru Suzuki................... 95/44 R Primary Examiner—Samuel S. Matthews
Assistant Examiner—Kenneth C. Hutchison
Attorney, Agent, or Firm—Flynn & Frishauf

[57] ABSTRACT

A discriminator feature means is provided on an interchangeable lens which has an angle of view larger than the light beam width angle of the flash projector normally used with the camera. The camera body is equipped with a sensor to disable flash photography when such a lens is fitted on to the camera body.

9 Claims, 9 Drawing Figures

PATENTED JUL 9 1974  3,823,411

(a)    (b)

FLASH DISABLING INTERLOCK RESPONSIVE TO INTERCHANGEABLE LENS SELECTION

BACKGROUND OF THE INVENTION

1. Field of the Invention

This invention is directed to the field of flash photography systems, and more particularly to an interlock for a camera using interchangeable lenses, arranged to disable flash photography when a lens is attached having a wider angle of view than the beam width of the flash equipment.

2. Description of the Prior Art

Light projected from the flash of a bulb or of a strobe light is commonly used to photograph objects or scenes of low brightness. The overall light radiation pattern of flash devices designed to be mounted on a camera, as well as that of flash devices built into cameras, shows that the bulk of the light is confined within a solid angle of relatively narrow beam width, which width is normally defined as the angle between the directions at opposite sides of a beam in which the light is radiated at half the energy rate of the radiation in the peak light intensity direction. On the other hand, the interchangeable lens itself interchangeably fitted on the camera has an angle of view which is generally inversely proportional to the ratio of the focal length to the width of the film. A wide zone cannot usually be satisfactorily illuminated by a light flash from near the camera location.

The problem will be described by reference to FIG. 1, which shows a camera C in which an interchangeable lens L is fitted, strobe means F fitted on the camera C, and an object S to be photographed. In accordance with the kind of lens L, fitted on the camera, standard or wide angle, there are respective angles of view $\theta_2$ and $\theta_1$. As the focal length shortens, the angle of view becomes larger, increasing the zones $L_1$-$L_1'$ and $L_2$-$L_2'$. On the other hand, the zone F-$F_1$, which can be illuminated by a strobe device of characteristic beam width angle $\theta_F$, does not change. The luminescence angle $\theta_F$ is of course an approximation simplifying the more complicated actual light distribution. Accordingly, a lens having an angle of view wider than $\theta_F$ is fitted on the camera C, the image photographed by flash exposes properly only the central portion of the picture.

SUMMARY OF THE INVENTION

Briefly, by the present invention a discriminator feature signal means is provided on an interchangeable lens that has an angle of view larger than the beam width of the flash illumination device normally used with the camera, so tha from the time of fitting a lens on the camera, the flash illumination equipment is automatically disabled by means responsive to the discriminator feature until the lens is removed. In a camera which incorporates a so-called automatic system to control the aperture stop in response to the focus distance adjustment for an object to be photographed, this automatic system is disabled according to the present invention, in favor of E.E. (Electric Eye) photography if the camera is equipped for the latter. In a camera provided with release locking means or alarm means to warn against an improper exposure, the release may be locked or the alarm is given instead of disabling the flash.

The invention will now be described by way of illustration with reference to the accompanying drawings.

DESCRIPTION OF THE PREFERRED EMBODIMENTS

Figure 2:
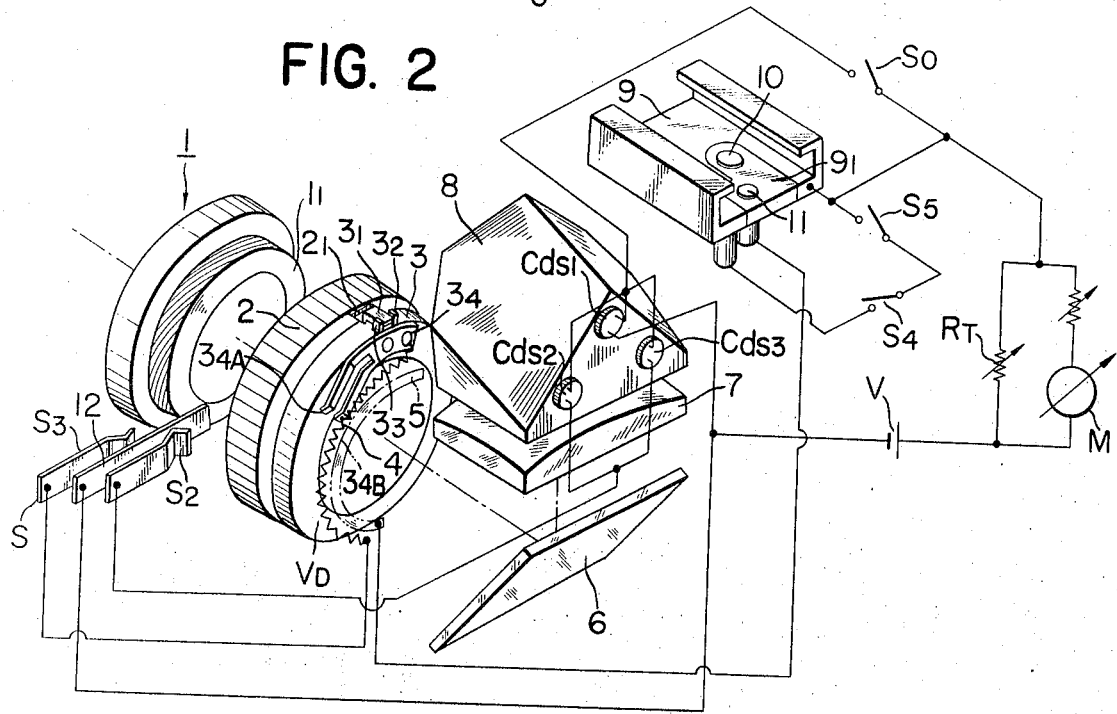
FIG. 2 is a perspective exploded view of parts of apparatus embodying the present invention.

FIG. 2 shows the lens mount of a single lens reflex camera and an interchangeable lens 1, a range controlling ring 2 having a fit portion adapted to fit to the screw mount portion $1_1$ of the lens 1 and also having a helicoid (not shown) adapted to displace the lens in the direction of the optical system axis by rotation of the fit portion, and an automatic flash aperture control ring 3 rotatably mounted coaxially with the range control ring 2 on the side of a camera body. The ring 3, hereafter referred to as the auto-flash ring, is provided with an engagement member $3_1$ pivotally supported between holding members $3_2$ and $3_3$ mounted around the ring 3, the member $3_1$ having its extremity formed for engagement with a recess $2_1$ drilled in a tapered portion of the range control ring 2. The reference character $3_4$ denotes a resilient movable contact piece with insulating materials (not shown) placed in layers on the side wall of the rear surface of the auto-flash ring 3 and fixed electrically insulated from the ring 3. The extremity of this piece branches to form two fork-like contact tangs $3_{4A}$ and $3_{4B}$. The contact tank $3_{4A}$ rests elastically on the resistance 4 disposed beneath the path of travel of the main body of that contact piece in the camera body, while the other contact fork tang $3_{4B}$ elastically rests on the narrow arched electrode 5 arranged alongside the resistance 4. The variable resistor adjusted by the movable contact piece $3_4$ has terminals provided connections to one end of the resistance 4 and to the electrode 5 respectively. The construction of the engagement member and the variable resistor has been disclosed in Japanese Patent Application No. 64549/1970.

FIG. 2 also shows a movable mirror 6, which is elevated by releasing the shutter and is lowered by closing the shutter, but the raising and lowering mechanism, however, is not shown. There are shown a focusing screen 7, and photoconductive elements $CdS_1$, $CdS_2$, and $CdS_3$ provided around the eye-piece of a pentagonal prism 8 (penta-prism). The photoconductive elements $CdS_1$ to $CdS_3$ are connected in parallel, as described later, and so arranged as to measure brightness of image surface for the object to be photographed formed in the focusing screen 7. An accessory shoe 9 is mounted on the body at the upper part of the pentaprism 8, its portion $9_1$ being formed from insulating material; the electrode terminals 10 and 11 have their surfaces exposed. The reference mark S denotes a switch $S_1$ situated by means of a displaceable arm 12 positioned so as to engage a portion of the rear surface of the interchangeable lens 1. In this drawing, the switch $S_1$ appears between the interchangeable lens 1 and the focus control ring 2 but it is actually provided on the side of camera body between the auto-flash ring 3 and the focus control ring 3 so as to be selectively switched by the rear end surface of the interchangeable lens mounted on the camera, as hereinafter described.

Figure 3:
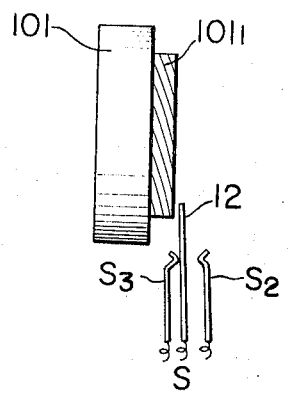
FIGS. 3(a) and (b) are diagrammatic side views of interchangeable lenses and a portion of the apparatus shown in FIG. 2.
Figure 3:
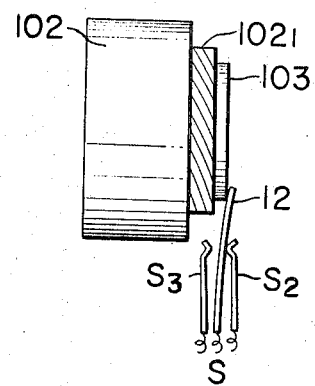

In FIG. 2 are also shown a power source switch $S_o$ actuated by a control dial, as described later, provided on the camera body, a switch $S_4$ which closes upon completion of winding of the shutter and opens upon completion of releasing the shutter, a variable resistor $R_T$ responsive to the shutter speed set, a meter M, and a power source V. If standard lens 101 is employed to serve as an interchangeable lens 1 as shown in FIG. 3a, the switch 12 is not actuated because of the absence of configuration features on the back of the mount portion $101_1$ of the lens which are able to engage the switch mount portion $101_1$. On the other hand, in the case of a wide angle lens, a configuration detail signal member 103 in the form of a ring-like projection edge coaxial with mount $102_1$ is provided on the back face of the mount portion $102_1$ of the lens 102, as shown in FIG. 3(b). As already mentioned, therefore, when the standard lens 101 is mounted on the camera body, the contact $S_3$ of the switch S remains open, as shown in FIG. 3(a), and the normally closed contact $S_2$ remains closed whereas if the wide angle lens 102 is used, switching is carried out when the switch arm 12 is displaced by the discriminator ridge 103 of the lens so as to open the switch $S_2$ and to close the switch $S_3$.

Figure 4:
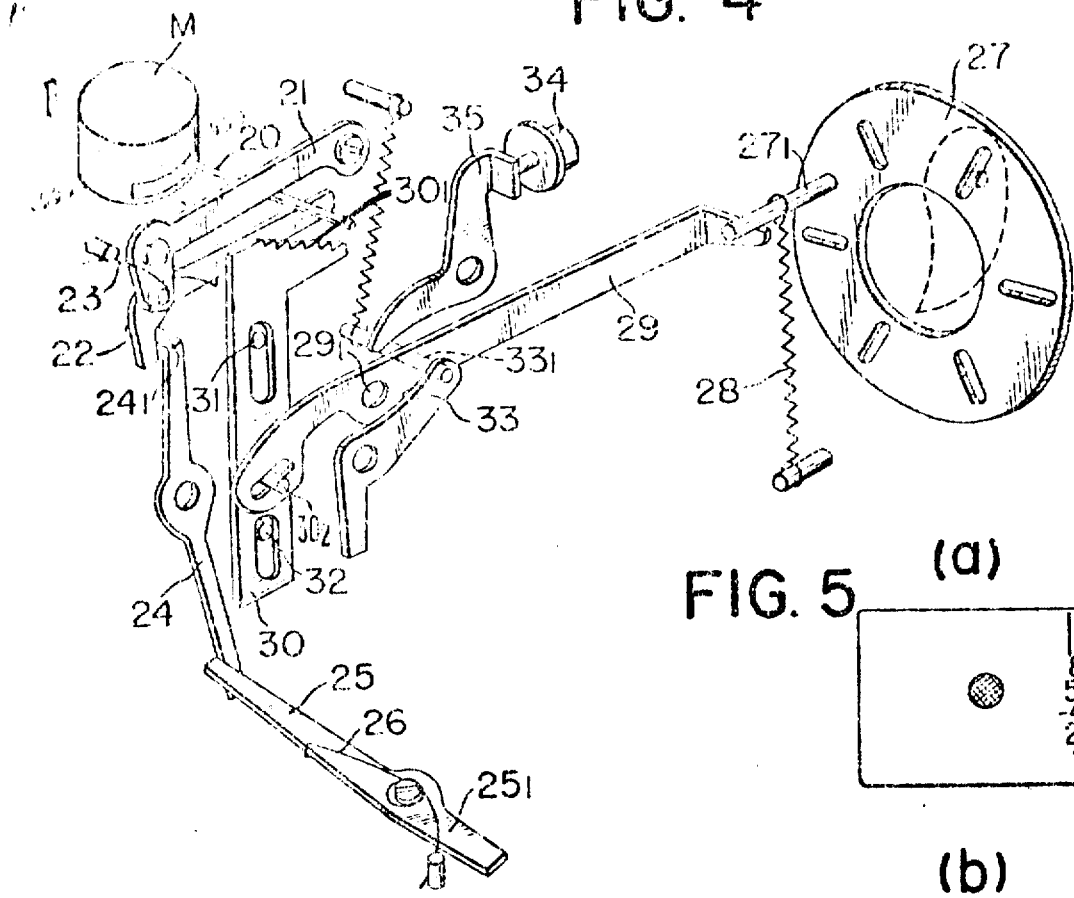
FIG. 4 is a perspective constructional view of a stop determination mechanism for use with the apparatus shown in FIG. 2.

The meter M is of such construction that an aperture stop is determined in response to the angle of deviation of a pointer of the meter M, by means of an aperture stop determination mechanism, as shown in FIG. 4. In FIG. 4, there are shown a pointer 20 of the meter M, a control member 21 adapted to control the rocking range of the pointer 20, a pointer holder plate 22 pivotally supported at one end of the control member 21 and subject to the rotating force in a counter-clock-wise direction of a spring 23, an intermediate lever 24 pivotally supported at its central portion and having a bent extremity $24_1$ engaged with one end of the holder plate 22, and a driving lever 25 having its central portion urged in a clock-wise direction by means of a spring 26, this driving lever being interlocked with a known type of driving mechanism (not shown) for depressing a release button to drive the lever end in a counter-clockwise direction against the action of the spring 26 so that the pointer 20 may be maintained within the range of control member 21 by rotation of the pointer holder plate 22 through the intermediate lever 24. The number 27 denotes a stop controlling ring having slits radially drilled in engagement with pins fixed on stop blades not shown and adapted to vary the aperture stop by being rotated. The number $27_1$ is a pin fixed on the ring 27. This stop controlling ring 27 may be provided either within the interchangeable lens 1 or on the camera body side, but in the present embodiment, it is arranged on the camera body side. There are shown a return spring 28, and a driving lever 29 pivotally supported at $29_1$ that has one end bent to engage with the pin $27_1$. FIG. 4 shows a 12-toothed member 30 provided with slits which engage with fixed pins 31 and 32 allowing members 30 to be linearly slidable, and a 12-step catch $30_1$, carrying a guide pin $30_2$. FIG. 4 further shows a driving lever 33 similar to the aforesaid lever 25, which is interlocked with a driving mechanism (not shown) of a movable mirror (not shown) and which is rotated in a clock-wise direction as said mirror elevates and is returned at the time the mirror descends, also a pin $33_1$ fixed on the lever 33 and arranged to engage with the underedge of the driving lever 29, and a restoring spring 34 mounted on said pin $33_1$. Also shown there are a hand-operated stop button 34 and an intermediate lever 35.

Operation

Figure 5:
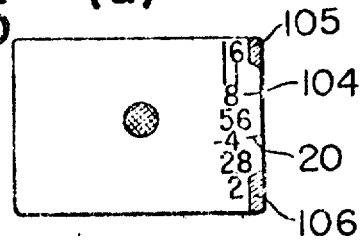
FIGS. 5(a) and (b) are explanatory views showing the indicating condition inside the finder of apparatus shown in FIG. 2.

When the pointer 20 of the meter M swings to an operating position and the shutter is then released, the movable mirror operates the lever 33 so that the pointer 20 is clamped between the holder plate 22 and the control member 21 through the levers 25 and 24; then the 12 step catch is displaced by an amount corresponding to the angle of deviation of the pointer 20 of the meter M through the levers 33 and 29, so that the stop controlling ring 27 is interlocked through the lever 29 to set the stop blade to the aperture as required. As shown in FIGS. 5(a) and (b), the end of the pointer of meter M appears in the side portion of the finder between the focusing screen and the penta-prism 8 to indicate within the finder a graduated stop value 104 under the focusing screen at the value at the time of photographing, with upper and lower alarm end zones 105 and 106.

Figure 6:
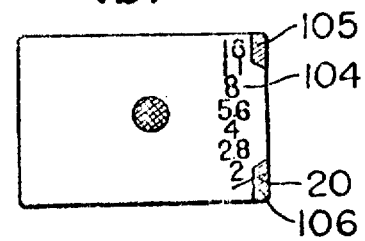
FIG. 6 is a perspective constructional view of a control knob applied to the apparatus as shown in FIG. 2.
Figure 6:
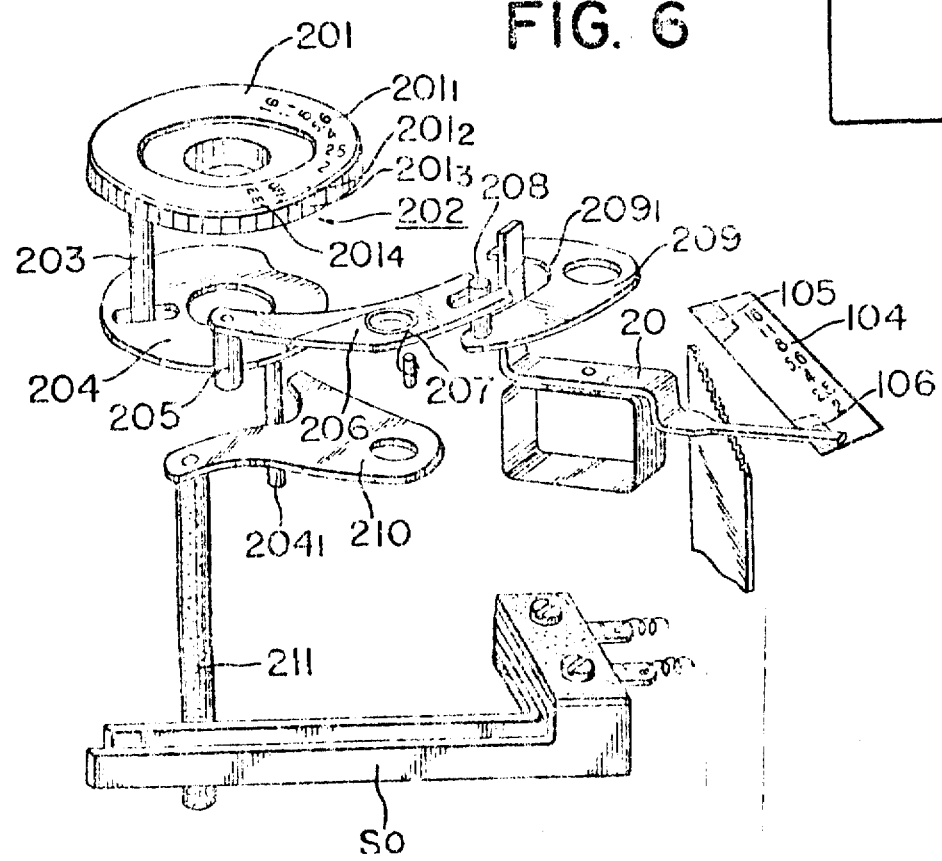

The pointer 20 of the meter M is further subject to manual operation by means of a mechanism shown in FIG. 6.

In FIG. 6, 201 is a control knob rotatably mounted on the camera body, and on that knob there are inscribed a manual stop value mark $201_1$, a flash mark $201_2$, an OFF mark $201_3$, and an automatic stop mark (E.E.) $201_4$. A fixed index is shown at 202. There are shown a pin 203 fixed in an eccentric position under the knob 201, a cam plate 204 having a slot in engagement with the pin 203 and having its peripheral edge formed like a cam, and a pin $204_1$ fixed under the cam plate 204. A follower pin 205 is pressed by the action of spring 207 against the peripheral edge of the cam plate 204 for the purpose of forcing it to rock the bent portion of the pointer 20, through the linkage 208, 209 when the control knob 201 is regulated by the manual stop $201_1$. The aforesaid switch $S_0$ is switched by an insulated bar 211 affixed on one end of an intermediate lever 210 actuated by the pin $204_1$ and is maintained in its open position unless the control knob is set on the E.E. mark $201_4$.

Figure 1:
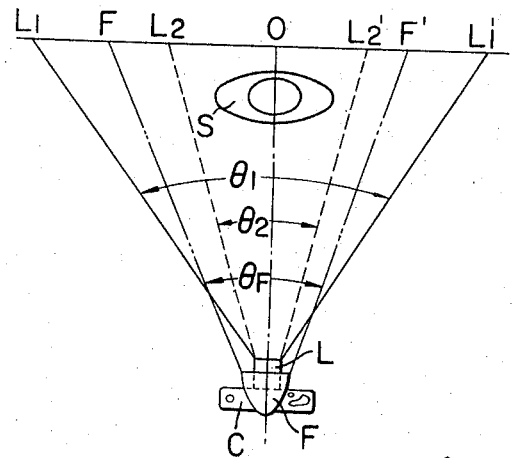
FIG. 1 is an explanatory diagram.
Figure 7:
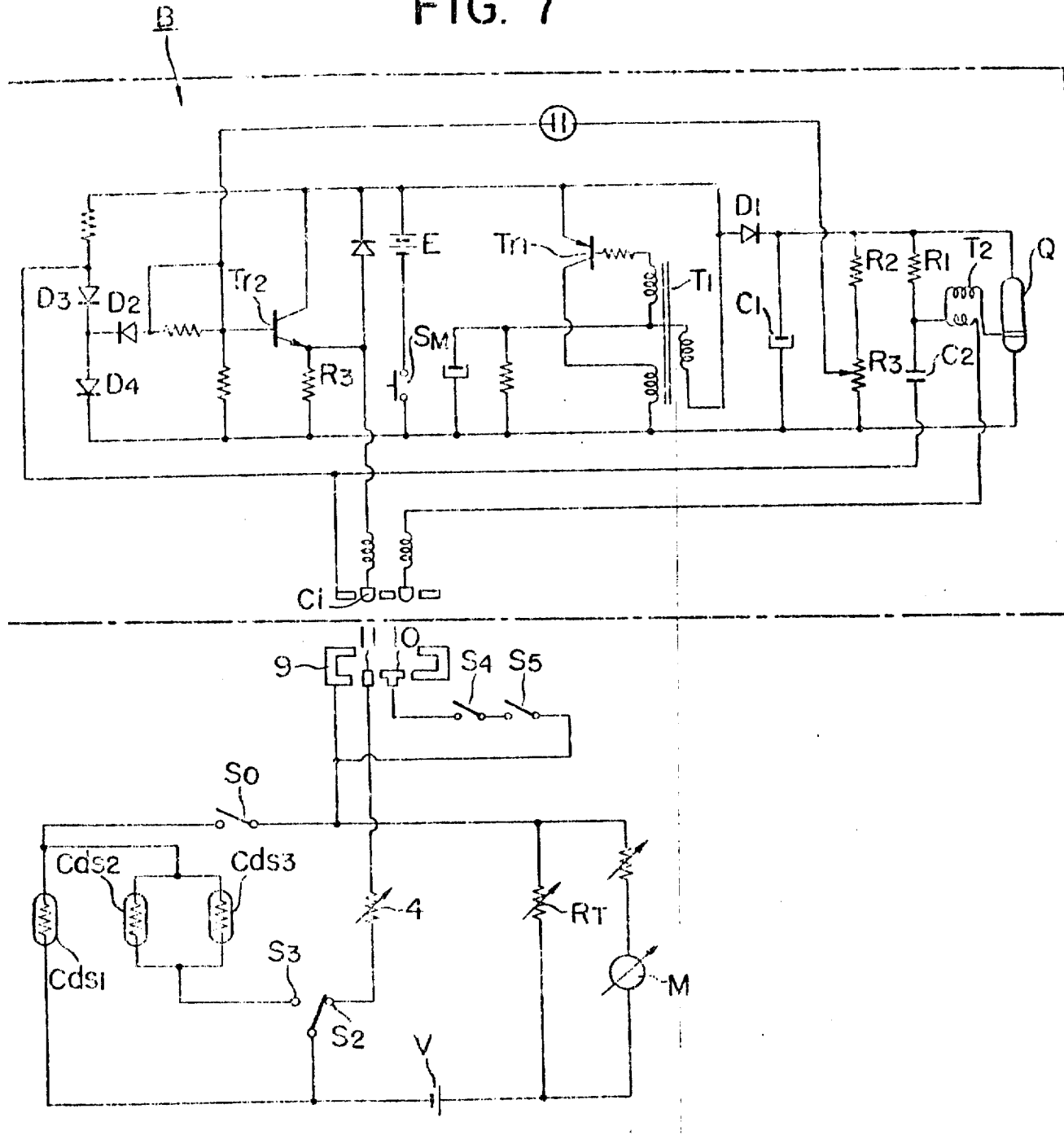
FIG. 7 is a diagram of a circuit usable in photographic apparatus of the invention.

FIG. 7 shows a strobe flash circuit B connected to the accessory shoe of the camera shown in FIG. 2 and to a camera circuit shown in FIG. 1. In FIG. 7 there are shown a driving power source E in the circuit B, an operating switch $S_M$, a transistor $Tr_1$ and a transformer $T_1$ comprising a step-up oscillation circuit, a rectification diode $D_1$, a main capacitor $C_1$, a trigger capacitor $C_2$ charged through a resistor $R_1$, a trigger transformer $T_2$, and a xenon tube Q. Since the above circuit is a known strobe flasher circuit, the detailed description thereof is omitted. Resistors $R_2$ and $R_3$ are connected in parallel with main capacitor $C_1$, and the tap terminal of variable resistor $R_3$ is connected to the base of transistor $Tr_2$. Therefore, transistor $Tr_2$ will be conductive in accordance with terminal voltage of main capacitor $C_1$ to apply a voltage developed in an emitter resistance $R_3$ to terminal Ci. On the other hand, a voltage of main capacitor $C_1$ is connected to the cathode of diode $D_3$ through the diode $D_2$, so that when voltage of main capacitor $C_1$ increases and reaches a charging voltage as required, the diode $D_3$ will be non-conductive, thus increasing an anode voltage of diode $D_3$. On the other hand, when charging voltage of main capacitor $C_1$ increases in excess of a given value, transistor $Tr_2$ will be conductive so that the emitter voltage will increase because of resistor $R_3$. Accordingly, voltage between terminals 9 and 11 is gradually reduced in value with the charging of main capacitor, thus applying a small amount of voltage at the time when main capacitor is completely charged. Since this applied voltage is in proportion to the terminal voltage of main capacitor, the is, illumination of the xenon tube, a guide number of the flasher means B will be applied, with said voltage, between terminals 9 and 11 in the form of a voltage value.

With the foregoing construction in mind, the operation will now be described. If flash photography is carried out with a strobe device attached to the camera body while using a standard lens as shown in FIG. 3(a), the switch S maintains $S_2$ and $S_3$ in the closed and open conditions, respectively, by attachment of the lens.

Next, when the operating switch $S_M$ of the strobe device is closed, a voltage corresponding to the guide number of the strobe device is applied to the electrode terminal 11 of the accessory shoe. Then, when the flash mark (⚡) of the control knob 201 is fitted to the fixed index 202, the switch $S_0$ will be turned OFF, as seen in FIG. 7. When the interchangeable lens 101 is displaced in the direction of the optical systen axis by rotation of the range control ring 2, the recess $2_1$ of the ring 2 and the engagement member $3_1$ of the auto flash mechanism are brought into engagement to integrally rotate the rings 2 and 3. When the distance to the object to be photographed is set in by rotation of the range control ring Z, the movable contact piece $3_4$ on the auto flash ring 3 is controlled concurrently with with the focussing of the interchangeable lens and is set to a position corresponding to that distance, whereby a resistance value in proportion to the distance to the object to be photographed is obtained in the terminal between the electrode 5 and the resistor 4. At this time, when the shutter is set at a point X by operating a shutter speed controlling dial (not shown), the resistor RT is set to a given value, so that the pointer of meter M swings in response to information of guide number for the combination of the distance to the object to be photographed and the shutter speed, thus indicating in the finder the stop value found appropriate for the flash photography exposure.

Further, when a release button (not shown) is depressed, the movable mirror 6 is released and, after the aperture stop as shown in FIG. 4 has been controlled in accordance with the position of the pointer 20 of meter M, the shutter will be opened and closed. Since a synchroswitch $S_4$ is closed by opening and closing the shutter, the xenon tube Q will be illuminated to complete the flash photography operation.

On the other hand, when a wide angle lens 102, which has a larger angle of view than the beam width of of the strobe attachment, is attached as an interchangeable lens 1, the switch S is not changed-over, maintaining switch $S_2$ and switch $S_3$ in the OFF and ON conditions, respectively, and when the control knob 201 is operated to set at the mark (⚡) to open the switch $S_0$, the meter circuit remains in its open condition so that the pointer of meter M does not deflect, being held in the alarm zone 106 shown in the finder (FIG. 3b), indicating that a stop is improperly set or that an unsuitable, lens 102 is attached. In this case, therefore, only fully manual or daylight photography may be performed, in the latter case with the control knob 201 fitted to the E.E. mark $201_4$ to close switch $S_0$, while the photoelements $CdS_1 - CdS_3$ are connected to the meter circuit and the stop is determined in accordance with the position of the pointer 20 of the meter which deflects in accordance to the brightness of the object to be photographed measured by the photoelements. In fully manual photography the control knob 201 is turned to the selected aperture indication on the scale $201_1$.

As is evident from the foregoing, according to the preferred embodiment of the invention, improper exposure is automatically indicated when the angle of view of an interchangeable lens is not suitable. It is also possible to provide a known release locking mechanism to lock the release member in a manner to disable its release when the pointer is positioned within the alarm zones 105 or 106, whereby when flash photography is tried with an unsuitable interchangeable 9 lens, the camera is not released and cannot be operated. Further, although strobe means of the type in which a guide number is developed as a voltage, as shown in the circuit B in FIG. 7, is employed to serve as an auxiliary illuminating means, a flash device using a conventional strobe means or a flash bulb may well be employed, and in this case, the same operation may take place as that with the foregoing embodiment, except that even if the electrode $9_1$ on the accessory shoe 9 is made to be short-circuited, guide number information is not automatically set.

Furthermore, in the aforesaid embodiment, the meter M is responsive to resistor RT, which is varied when shutter speed is controlled by rotating a shutter controlling dial (not shown), in series with elements $CdS_1$ to $CdS_3$ ( in case of the wide angle lens), and $CdS_1$ (in case of the standard lens), and the pointer 20 of meter M provides an angle of deviation as required. Then, when a shutter button (not shown) is depressed, the lever 25 shown in FIG. 4, which is interlocked with the mirror 6 being driven upwards, causes the holder plate 22 to spring up through the lever 24, maintaining the pointer 20 against the control member 21. At this time, light from the object to be photographed directed to elements $CdS_1$ to $CdS_3$ is shut off by the movement of the mirror and the pointer 20 is clamped, immediately before said shutting off takes place, by means of the holder plate 22 so that the angle of deviation of the pointer memorizes the brightness of object to be photographed in the form of a mechanical quantity.

Then, the step plate 30 elevates in response to levers 33 and 29 and abuts on the pointer 20 to stop the stop controlling ring 27, thus controlling the aperture stop. The shutter is then released to provide exposure at a shutter speed as controlled.

In the foregoing embodiment, a mechanical memory by displacement of the pointer of the meter has been illustrated but it will be evident how to obtain an effect similar to the above by the provision of construction in which a motor is used in place of a meter, a rotor of the motor being rotated with a return spring mounted thereon, so as to utilize the amount of rotation as a mechanical memory. Further, in the foregoing embodiment, it was mentioned in connection with E.E. photography that mark $201_4$ of the control knob 201 is fitted to the fixed index 202, while in the case of flash photography, the mark $201_2$ is arranged to put the switch $S_0$ in OFF position, but if that knob position is maintained, at the time of flash photography, without being changed over from the E.E. photography mark $201_4$, the elements $CdS_1$ to $CdS_3$ are connected to the meter M circuit at all times, while the aperture stop is controlled in reference to the value of incident natural light, if any, on the object to the photographed at the time.

Thus, the invention provides a discriminator feature fixed on an interchangeable lens to automatically discriminate whether the normal flash equipment is suitable for use with the lens, and if it is unsuitable, a warning is given or the operation of the camera is disabled.

The absence of a feature on a wide-angle lens which is provided on a standard lens to enable flash attachment operation is of course, by obvious equivalency, a discriminating feature of the wide-angle lens.

We claim:

1. A camera body for use with interchangeable lenses and having lens mount means and also coordinating means for flash photography, said camera comprising the improvement which consists of:
    sensing means on said lens mount means for detecting the presence of a discriminator feature in the configuration of interchangeable lenses with a viewing angle too wide for a flash photography light source of a predetermined beam width, and
    interlock means responsive to said sensing means for blocking flash photography when a discriminator feature of an interchangeable lens is detected by said sensing means as aforesaid.

2. A camera body according to claim 1 in which said interlock means includes switch means for interrupting an operating electric circuit in said flash coordinating means.

3. A camera body according to claim 1 including also an exposure control system having a voltage source and variable resistance means, and also including range control means arranged for coupling with the focus control of an interchangeable lens, said variable resistance means being arranged to have its resistance varied in accordance with the position of said range control means and being in circuit with said voltage source in said exposure control, and in which said interlock means is arranged to disable the connection of said variable resistance means in said exposure control system when said sensing means detects a discriminator feature of an interchangeable lens as aforesaid.

4. A camera body according to claim 1 including also an exposure control system in which said exposure control system and a shutter provided with shutter release means, in which the said exposure control system includes locking means for blocking said shutter release means interconnected with said interlock means to block said shutter release means, said exposure control system including a galvanometer and also means for blocking said shutter release means when the movable element of said galvanometer is in a position corresponding to an unsuitable exposure value, and in which, further, said interlock means is arranged to modify the circuit of said galvanometer to cause its movable element to move into a position corresponding to an unsuitable exposure value whenever said sensing means detects a discriminator feature of an interchangeable lens as aforesaid.

5. A camera body according to claim 1 in which said sensing means is arranged for detecting the presence of a mechanical discriminator feature embodied in the mount portion of an interchangeable lens.

6. A camera body as defined in claim 5 containing also photometric means including a galvanometer and in which said interlock means includes a switch an extension of one of the members of which serves as said sensing means, said switch being arranged to interrupt a flash photography operating circuit of said coordinating means and to modify the operating circuit of said galvanometer.

7. A camera body according to claim 6 in which said switch is a leaf switch provided with transfer contacts, the arm of which has an extension serving as said sensing means.

8. A camera body as defined in claim 7 in which said exposure control system includes at least one photoconductive transducer means for responding to light from an object to be photographed.

9. A camera body according to claim 8 in which said interlock means is arranged for selectively connecting the galvanometer of said exposure control system with either a variable resistive means or said photoconductive transducer means and is so arranged that connection of said variable resistor means with said galvanometer is selected only when no discriminator feature of an interchangeable lens is detected by said sensing means as aforesaid.

* * * * *

UNITED STATES PATENT OFFICE
CERTIFICATE OF CORRECTION

Patent No. 3,823,411     Dated July 9, 1974

Inventor(s) Goro HASEGAWA; Masao AOYAGI and Yukio MASHIMO

It is certified that error appears in the above-identified patent and that said Letters Patent are hereby corrected as shown below:

On page 1 of the patent, Column 2, after the Abstract, change "9 Drawing Figures" to -- 7 Drawing Figures --.

An additional 2 sheets of drawings showing Figures 4-7 should appear after the first sheet of drawings showing Figures 1-3b (as shown on the attached copy of the drawings).

Signed and Sealed this eighteenth Day of November 1975

[SEAL]

Attest:

RUTH C. MASON
Attesting Officer

C. MARSHALL DANN
Commissioner of Patents and Trademarks (b)